(12) United States Patent
Hopsecger

(10) Patent No.: US 7,587,251 B2
(45) Date of Patent: Sep. 8, 2009

(54) REMOTE MONITORING AND CONTROL OF AN I/O MODULE

(75) Inventor: Edward C. Hopsecger, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 265 days.

(21) Appl. No.: 11/313,979

(22) Filed: Dec. 21, 2005

(65) Prior Publication Data

US 2007/0142926 A1 Jun. 21, 2007

(51) Int. Cl.
- *G05B 11/01* (2006.01)
- *G05B 19/18* (2006.01)
- *G05B 15/00* (2006.01)
- *G06F 7/00* (2006.01)

(52) U.S. Cl. ............... 700/17; 700/65; 700/83; 700/168; 709/203; 709/219

(58) Field of Classification Search ............... None
See application file for complete search history.

(56) References Cited

U.S. PATENT DOCUMENTS

| | | | |
|---|---|---|---|
| 5,734,831 A | 3/1998 | Sanders | |
| 6,061,603 A | 5/2000 | Papadopoulos | |
| 6,151,625 A | 11/2000 | Swales | |
| 6,201,996 B1 * | 3/2001 | Crater et al. | 700/9 |
| 6,353,853 B1 | 3/2002 | Gravlin | |
| 6,363,423 B1 * | 3/2002 | Chiles et al. | 709/224 |
| 6,374,296 B1 * | 4/2002 | Lim et al. | 709/225 |
| 6,385,497 B1 * | 5/2002 | Ogushi et al. | 700/110 |
| 6,405,099 B1 | 6/2002 | Nagai et al. | |
| 6,453,687 B2 * | 9/2002 | Sharood et al. | 62/127 |
| 6,510,350 B1 | 1/2003 | Steen, III | |
| 6,567,863 B1 | 5/2003 | Lafuite et al. | |
| 6,584,601 B1 * | 6/2003 | Kodosky et al. | 716/4 |
| 6,587,900 B1 | 7/2003 | Wischinski | |
| 6,608,638 B1 * | 8/2003 | Kodosky et al. | 715/771 |
| 6,732,191 B1 | 5/2004 | Baker | |
| 6,760,782 B1 | 7/2004 | Swales | |
| 6,788,980 B1 * | 9/2004 | Johnson | 700/1 |
| 6,791,467 B1 * | 9/2004 | Ben-Ze'ev | 340/825.69 |
| 6,795,798 B2 * | 9/2004 | Eryurek et al. | 702/188 |
| 6,799,195 B1 * | 9/2004 | Thibault et al. | 709/203 |
| 6,915,330 B2 | 7/2005 | Hardy | |
| 6,975,913 B2 * | 12/2005 | Kreidler et al. | 700/96 |

(Continued)

FOREIGN PATENT DOCUMENTS

| | | |
|---|---|---|
| EP | 0973297 | 1/2000 |
| EP | 1175062 | 8/2007 |
| WO | 0169335 | 9/2001 |

OTHER PUBLICATIONS

European Search Report dated Apr. 18, 2007, mailed Apr. 27, 2007, for European Patent Application Serial No. 06026336, 12 pages.

*Primary Examiner*—Ronald D Hartman, Jr.
(74) *Attorney, Agent, or Firm*—Turocy & Watson, LLP; R. Scott Speroff

(57) ABSTRACT

An industrial automation monitoring and/or control system comprises a receiver component that receives a request for a web page associated with a network adaptor. An execution component executes instantiated objects within the web page to effectuate at least one of monitoring and control of an input/output module that is communicatively coupled to the network adaptor.

25 Claims, 19 Drawing Sheets

U.S. PATENT DOCUMENTS

| | | |
|---|---|---|
| 6,978,227 B2 | 12/2005 | Buda |
| 6,978,294 B1 * | 12/2005 | Adams et al. ............... 709/217 |
| 7,085,938 B1 * | 8/2006 | Pozzuoli et al. ............ 713/300 |
| 7,130,719 B2 * | 10/2006 | Ehlers et al. ................ 700/276 |
| 7,191,021 B2 * | 3/2007 | Prasad et al. ................. 700/83 |
| 7,203,560 B1 * | 4/2007 | Wylie et al. ................. 700/110 |
| 7,275,096 B2 * | 9/2007 | Green ........................ 709/223 |
| 2002/0046221 A1 * | 4/2002 | Louis Wallace et al. ..... 707/513 |
| 2002/0068983 A1 * | 6/2002 | Sexton ........................... 700/2 |
| 2002/0156838 A1 | 10/2002 | Balke et al. |
| 2003/0084201 A1 | 5/2003 | Edwards et al. |
| 2004/0181292 A1 * | 9/2004 | Ha et al. ........................ 700/17 |
| 2004/0205185 A1 * | 10/2004 | Leonik ......................... 709/224 |
| 2004/0260518 A1 * | 12/2004 | Polz et al. .................... 702/188 |
| 2005/0027794 A1 * | 2/2005 | Decker ........................ 709/201 |
| 2006/0067209 A1 * | 3/2006 | Sheehan et al. ............. 370/216 |

* cited by examiner

REMOTE MONITORING AND CONTROL OF AN I/O MODULE

TECHNICAL FIELD

The subject invention relates generally to industrial control systems and, more particularly, to remote monitoring and/or control of a process.

BACKGROUND

Due to advances in computing technology, businesses today are able to operate more efficiently when compared to substantially similar businesses only a few years ago. For example, networking enables employees of a company to communicate instantaneously by email, quickly transfer data files to disparate employees, manipulate data files, share data relevant to a project to reduce duplications in work product, etc. Furthermore, advancements in technology have enabled factory applications to become partially or completely automated. For instance, operations that once required workers to put themselves proximate to heavy machinery and other various hazardous conditions can now be completed at a safe distance therefrom.

Further, imperfections associated with human action have been minimized through employment of highly precise machines. Many of these factory devices supply data related to manufacturing to databases that are accessible by system/process/project managers on a factory floor. For instance, sensors and associated software can detect a number of instances that a particular machine has completed an operation given a defined amount of time. Further, data from sensors can be delivered to a processing unit relating to system alarms. Thus, a factory automation system can review collected data and automatically and/or semi-automatically schedule maintenance of a device, replacement of a device, drive actuators, respond to data in real-time, and other various procedures that relate to automating a process.

To effectuate suitable industrial automation, many enterprises utilize a plurality of disparate networks designed for industrial automation to communicate data between components within an industrial setting. In more detail, networking protocols conventionally employed for personal computers in an office or home environment are often insufficient for an industrial setting, as real-time receipt and processing of data is typically required in such settings. Accordingly, various protocols for industrial environments have been designed for utilization in industrial environments, and application layer protocols have also been designed thereon to enable communication of data across disparate industrial protocols.

Remotely monitoring inputs and/or outputs of sensors and/or actuators has conventionally been an expensive and complicated task. More particularly, to effectuate remote monitoring and/or control of a process, an individual or company must purchase a proprietary software application that enables communications to occur between a remote device (such as a personal computer) and an actuator/sensor. Typically, such software is quite expensive and must be modified by the creator of the software for a particular application. Often, on-site visits by a provider of the software application are required prior to implementing such software, even further raising such expense. Thereafter, proprietary message formats must be employed to setup and receive information from a remote location. For instance, a controller can gather input messages and evaluate control elements associated with such messages, and package such data as a particular message to proprietary software. The software can then forward such data to a remote location.

SUMMARY

The following presents a simplified summary of the claimed subject matter in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

Described herein are systems, methodologies, apparatuses, and/or articles of manufacture that enable remote monitoring and control of an I/O module without the expense and complexity associated with previous monitoring and control systems. In more detail, a web page can be built that includes a plurality of instantiated objects, wherein execution of such objects results in monitoring or control of an I/O module. For example, a network adaptor, such as a network interface card, can be associated with its own homepage. Such homepage can include an editor applet, wherein graphical function objects (that are later instantiated as applets) can be arranged and interconnected according to user desires within a project. Later the project file can be saved on a local or network drive. Once arranged and defined, a Netlist can be generated that describes identity and relationships amongst the function objects. The Netlist, for example, can be in the form of an HTML file that can be reviewed through employment of a browser. Upon launch, the applets within the HTML file can execute according to relationships described in an original project file, and the I/O module(s) associated with the network adaptor can be monitored and/or controlled.

After the HTML file has been built as a Netlist of applets, it can be archived upon a local or network drive and saved to the network adaptor, whereby it can be accessed from any suitable location by any suitable device that has browser capabilities. Accordingly, a laptop, a personal computer, a personal digital assistant, a portable telephone, and the like can be employed to open the HTML page and execute the instantiated objects therein. Furthermore, any suitable device can be utilized to create the HTML page. Therefore, it can be discerned that monitoring and/or controlling an I/O module from a remote location is inexpensive and portable.

A mechanism for converting data between web-based data and data that conforms to an industrial automation protocol is also described herein. For instance, typical I/O modules receive, interpret, and output data in accordance with an industrial automation protocol. These industrial automation protocols may be nested within other protocols (e.g. Ethernet or other web-based protocols). A conversion component can be used to accept web-based messages containing control data and deliver XML formatted input data. An XSL style sheet or any other suitable conversion mechanism can be employed to display the XML data obtained from the network adaptor collected via an industrial automation protocol format.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
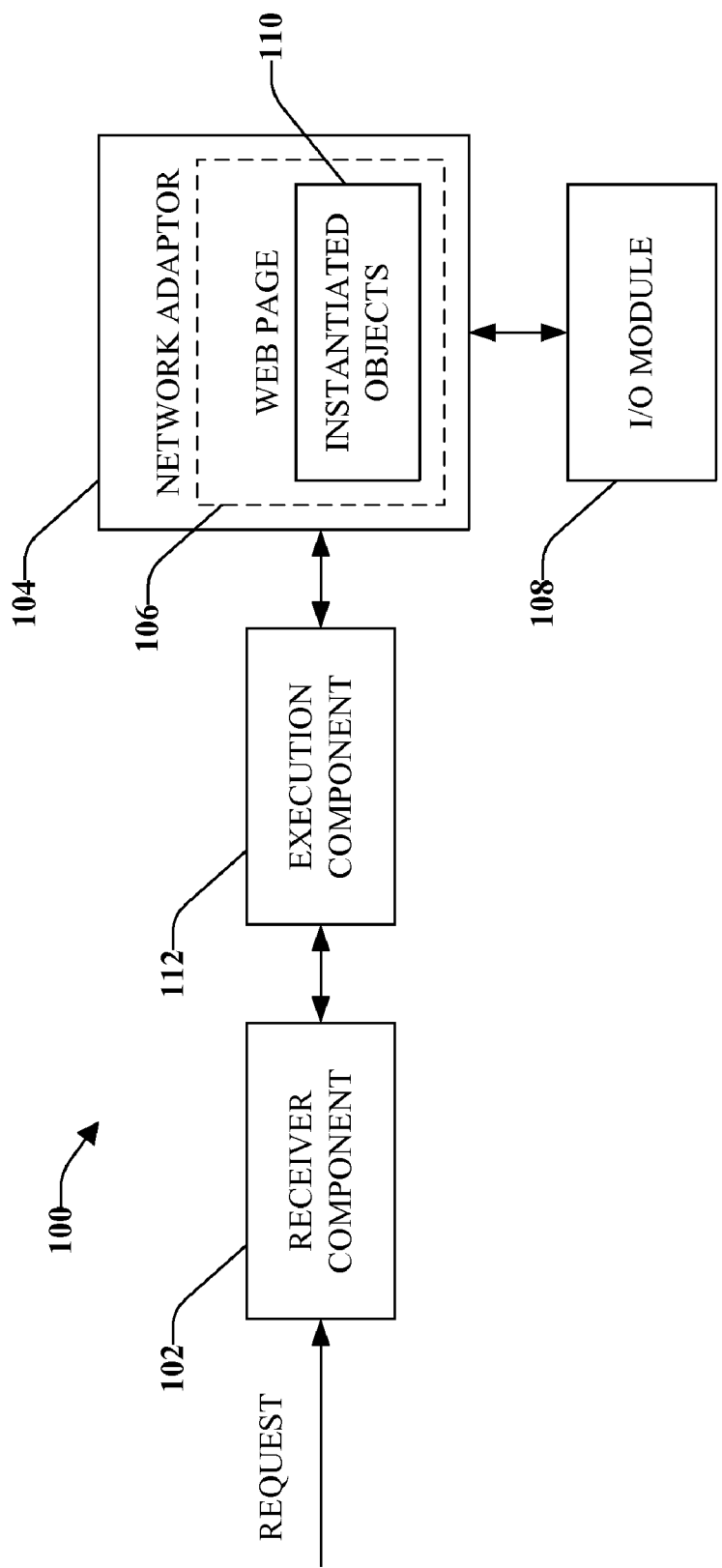
FIG. 1 illustrates a system that facilitates remote monitoring and/or control of an I/O module through utilization of a web browser.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component may be, but is not limited to a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers. The word "exemplary" is used herein to mean serving as an example, instance, or illustration. Any aspect or design described herein as "exemplary" is not necessarily to be construed as preferred or advantageous over other aspects or designs.

Furthermore, aspects of the claimed subject matter may be implemented as a method, apparatus, or article of manufacture using standard programming and/or engineering techniques to produce software, firmware, hardware, or any combination thereof to control a computer to implement various aspects of the subject invention. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of what is described herein.

Now referring to the drawings, FIG. 1 illustrates a system 100 that enables remote monitoring and/or control of a process or application. The system 100 includes a receiver component 102 that receives a request for a homepage that is associated with a network adaptor 104. For example, the homepage of the network adaptor 104 can be accessed over an Ethernet connection by way of directing a browser to a location of the homepage. Such homepage can include and/or be associated with one or more applets that enable editing and configuring of a control process that is remote from an initiator of the request. In one particular example, the homepage can include an editor applet that can be initiated upon selection of a graphical icon or button, thereby enabling an initiator of the request to create/edit a web page 106 (e.g., an HTML page) that can be employed for monitoring and/or control of a process. Upon enabling the editor applet within the homepage, the initiator of the request can have access to one or more graphical function blocks that can be manipulated and arranged in a manner desired by a user. For instance, function blocks can include counter function blocks, mathematical function blocks, Boolean comparison function blocks, and any other suitable function blocks that can be utilized for monitoring or controlling a process.

Upon certain function blocks being graphically associated with one another by the initiator of the request, such initiator can request a build, resulting in creation of the web page 106 (which is associated with one or more I/O module(s) 108). The I/O module 108 can be, for example, a sensor, an actuator, a temperature monitor, a local controller, or any other suitable I/O module. In more detail, an "HTML Netlist" can be automatically built which includes relationships between applets represented by the function blocks placed in a file associated with a particular project (e.g., a project file). Thus, dependencies of the applets (which can be Java applets), direction of data between applets, and the like can be automatically generated in the form of a Netlist. The web page 106 can then be archived to a local drive or a network server, stored within the network adaptor 104, or placed in any other suitable storage location. Upon building the web page 106, such web page 106 can be automatically launched from the network adaptor (104) to enable monitoring and/or control of the I/O module 108.

Thus, the initiator of the request can cause the web page 106 to be built and then utilize such web page 106 or the web page 106 can be pre-existent, wherein the user requests the web page 106 through employment of a browser. The web page 106 (after the build) includes one or more instantiated objects 110 that result from the build of the web page 106 (which can be an HTML web page). The objects 110 can be Java applets, wherein relationships of such applets can be defined within the Netlist. An execution component 112 can cause the instantiated objects 110 to execute within the web page 106 and control the I/O module 108 or monitor data associated with the I/O module 108. In one specific example, the I/O module 108 can be a sensor that senses completion of a product. The web page 106 can be built to enable counting of a number of complete products and generating an alarm upon completion of a threshold number of products. Thus, the instantiated objects 110 can include a counting function block and a comparison function block. Upon an individual accessing the web page 106 and the execution component 112 executing the instantiated objects 110, the above-described functionality can be enabled.

Figure 2:
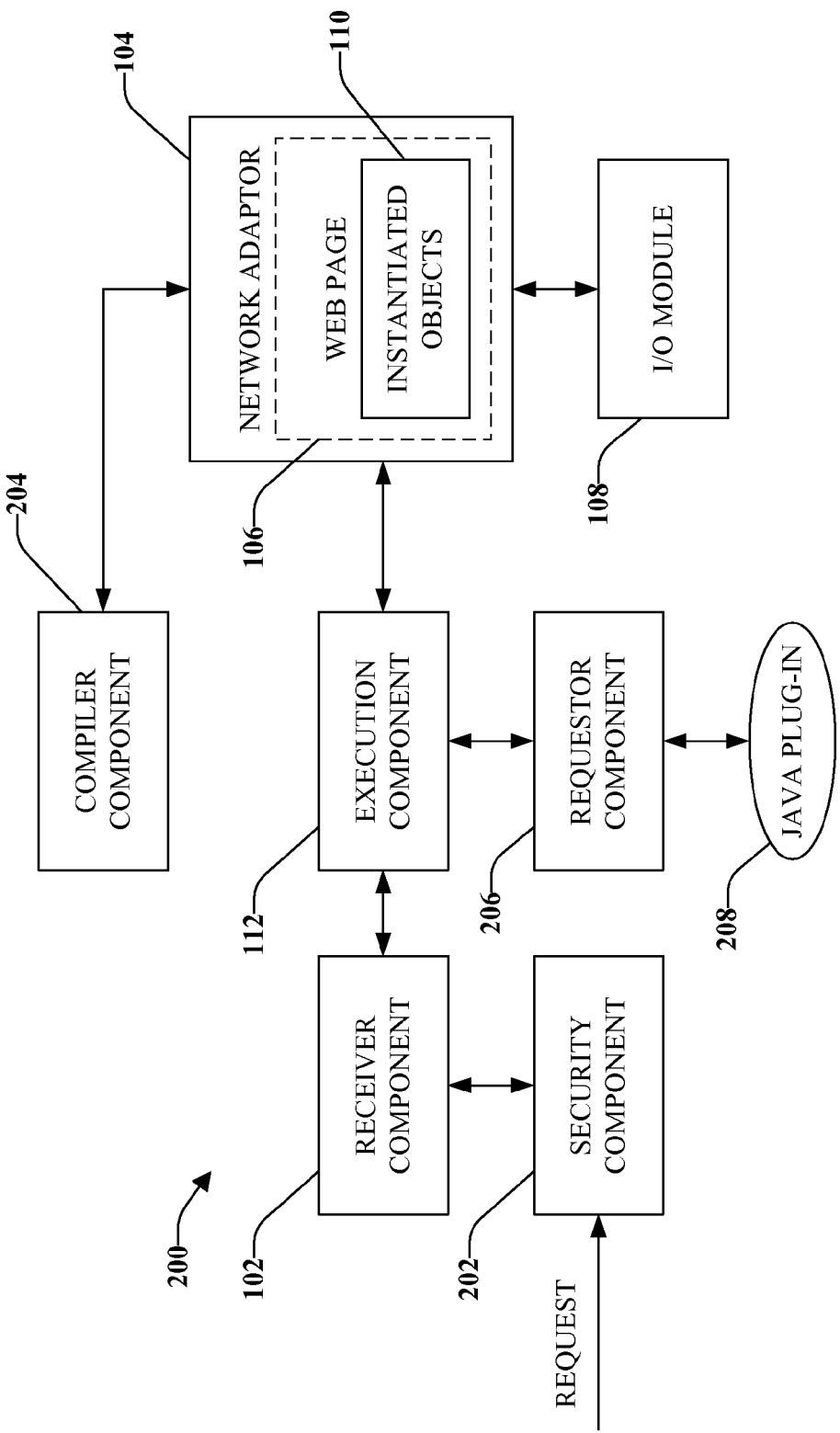
FIG. 2 illustrates a system that ensures that an individual requesting to remotely monitor and/or control an I/O module is authorized to initiate such request.

Turning now to FIG. 2, a system 200 for monitoring and/or controlling an industrial process from a remote location is illustrated. The system 200 includes a security component 202 that receives a request to access a homepage of the network adaptor 104 or the web page 106 that can be utilized to control/monitor the remote I/O module 108. To ensure that the initiator of the request is authorized to access and/or execute the homepage or the web page 106, the security component 202 can receive and analyze one or more of a user identification, password, personal identification number, and/or biometric indicia (such as a fingerprint, voice analysis, . . . ) associated with the initiator of the request. Furthermore, the security component 202 can utilize a virtual private network (VPN), a firewall, or any other suitable manner for only enabling authorized individuals to access and/or execute the network adaptor 104, the homepage, and/or the web page 106.

After the initiator of the request has been authorized, such request can be analyzed and serviced accordingly. For instance, if the request is for the homepage of the network adaptor 104, the receiver component 102 can enable the initiator of the request to access such homepage. Thereafter, the web page 106 for the I/O module 108 (which is communicatively coupled to the network adaptor 104) can be built. More specifically, function blocks can be selected and arranged by the initiator of the request, and a compiler component 204 (which can be included within an editor applet) can build the web page 106 by way of creating a Netlist that includes the function objects and relationships therebetween. An exemplary portion of a Netlist that can be created by the compiler component 204 is provided in Appendix A for illustrative purposes.

A file that includes this Netlist can be built by the compiler component 204 (by way of an editor running in the browser launched from the homepage of the network adaptor 104), saved on the network adaptor 104, and launched from such adaptor 104. Similarly, after creation of the web page 106, a requesting entity can directly access such web page 106 by directing a browser to the page. Additionally, the web page 106 can be accessed by way of the homepage of the network adaptor 104. Once the web page 106 is launched, the execution component 112 can execute the instantiated objects 110 within the web page 106. In more detail, the execution component 112 can be associated with a requestor component 206 that retrieves a Java plug-in 208 for utilization by the execution component 112. The execution component 112 can then employ the Java plug-in 208 to execute the instantiated objects 110 within the web page 106. The I/O module 108 can thereafter be controlled and/or monitored based upon the execution of the instantiated objects 110 (which operate in accordance with the Netlist). For instance, data can be relayed between the I/O module 108 and the network adaptor 104 according to the executing instantiated objects 110.

Figure 3:
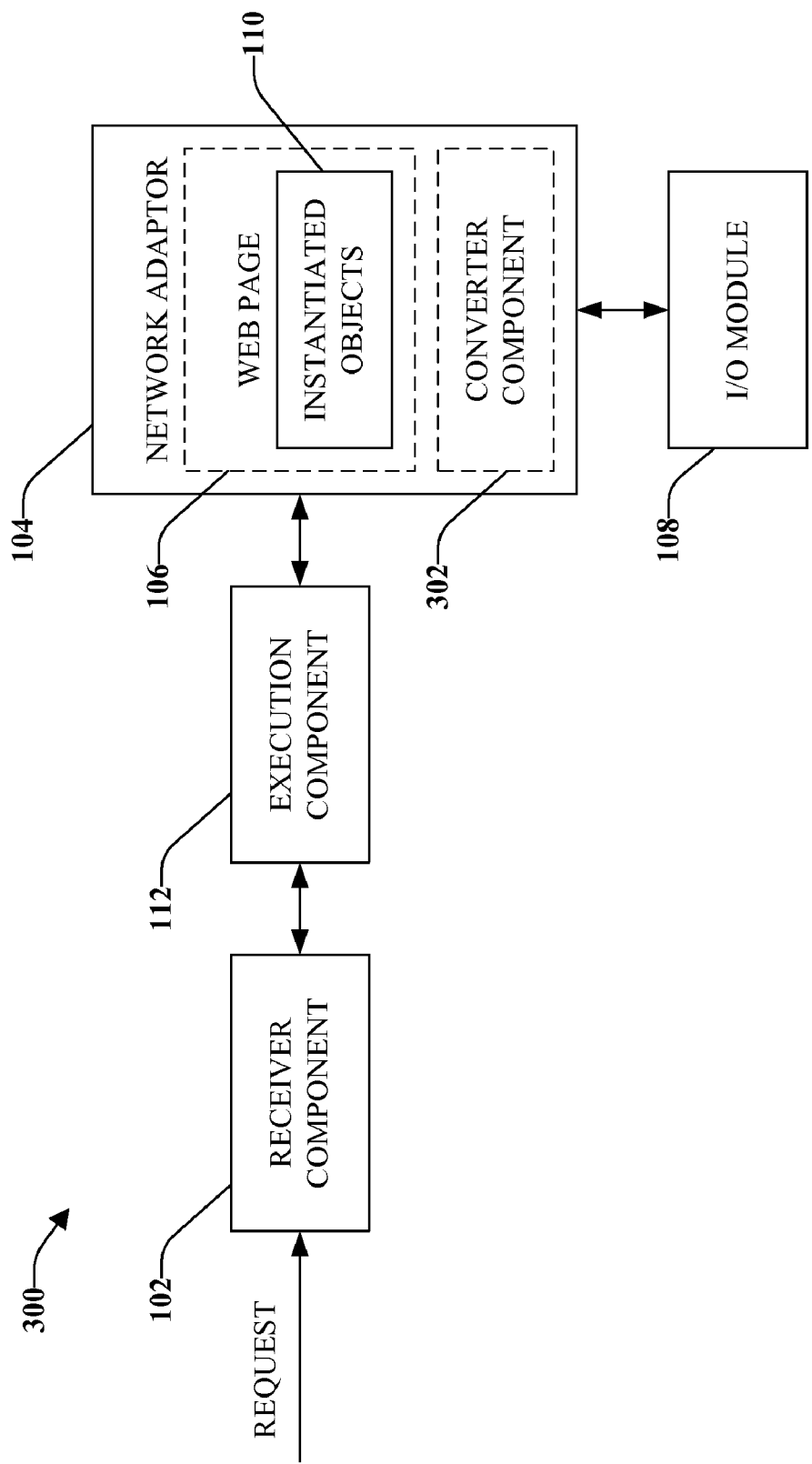
FIG. 3 illustrates a system for converting data between a web-based format and an industrial automation protocol format.

Referring now to FIG. 3, a system 300 that facilitates control and/or monitoring of the I/O module 108 from a remote location is illustrated. The system 300 includes the receiver component 102 that receives a request for the web page 106 (either directly, indirectly through a homepage of the network adaptor 104, or after creation of the web page 106). The request can then be provided to the execution component 112, which executes instantiated objects 110 within such web page 106. Execution of these instantiated objects in a manner described by a Netlist can enable monitoring and/or control of the I/O module 108. While the web page 106 can be accessed by way of Ethernet, the I/O module 108 may only be able to comprehend data that is formatted in accordance with an industrial automation protocol, such as the Common Industrial Protocol (or the Control and Information Protocol) (CIP), ProfiBus, FieldBus, EtherNetIP, DeviceNet, ControlNet, or other suitable protocol. Accordingly, the system 300 can include a converter component 302 that converts data from a web server's http format to a format that conforms to an industrial automation protocol. More particularly, the converter component 302 can define a message format employed by the instantiated objects 110 (which can be applets) to request data from the adaptor 104, wherein the data associated with the adaptor conforms to the industrial automation protocol.

In one example, the converter component 302 can be accessed by a dynamic link library (DLL) to provide an interface between the web server and an industrial automation protocol. For instance, employing the Internet Server Application Programming Interface (ISAPI) an extended Internet address can be formed by a requestor (e.g. an applet, text box and button, . . . ) that causes a DLL to be executed on the network adaptor. This DLL can act as an interface between the web server and the converter component 302. The DLL forwards the data within the extended Internet address to the converter component 302 and receives a response from same. The DLL then transmits an XML formatted response to the original requestor. An associated XSL style sheet can be called to transform the XML data stream into a displayable format. In another example, an applet can generate the extended internet address with associated DLL reference and data, send it to the network adaptor 104, which can then display the XML response.

Figure 4:
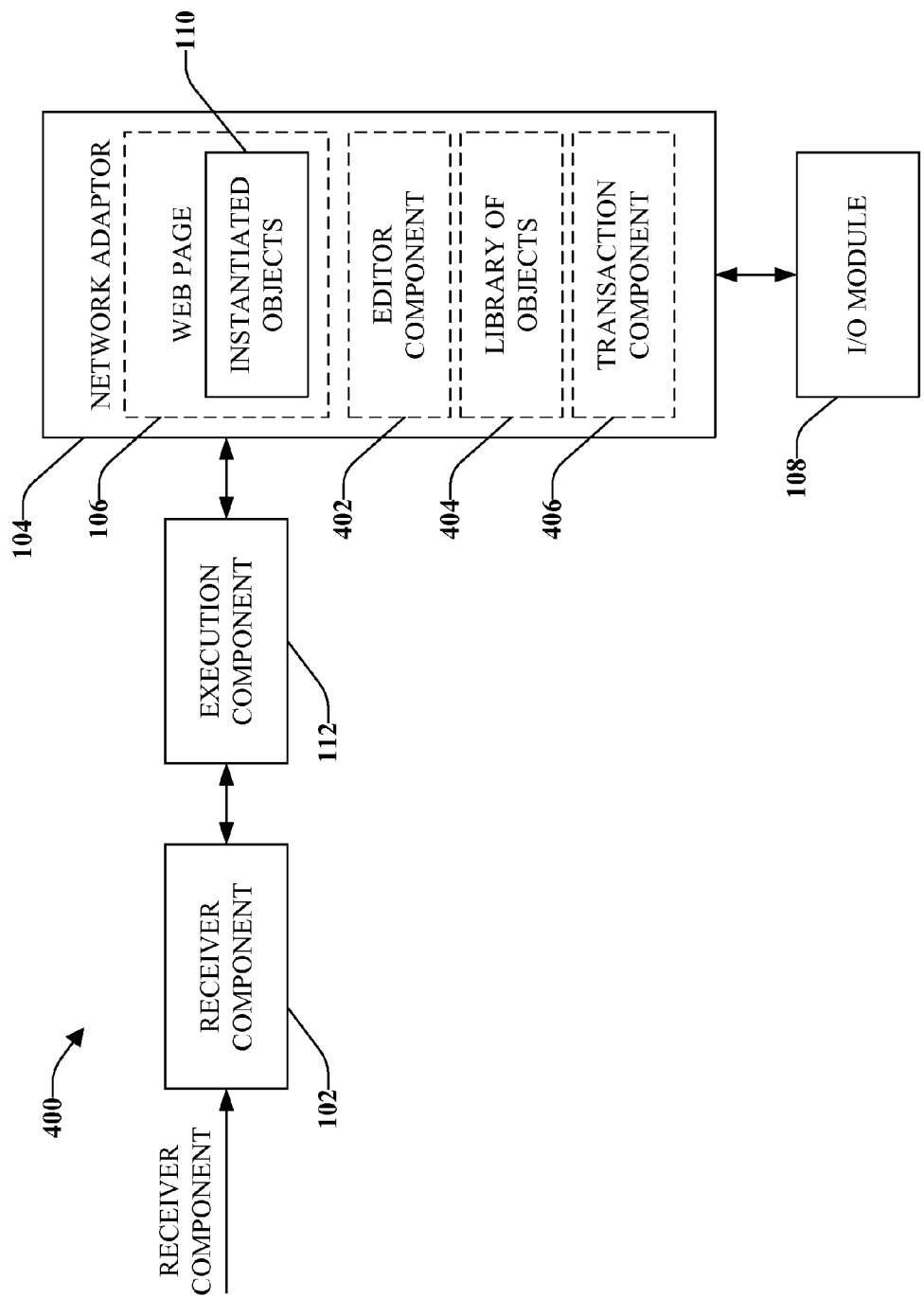
FIG. 4 illustrates a system for purchasing function objects that can be instantiated within a web page, the web page employable to control and/or monitor an I/O module.

Referring now to FIG. 4, a remote monitoring/control system 400 is illustrated. The system 400 includes the receiver component 102 that receives a request to access a homepage of the network adaptor 104. Such homepage can be associated with an editor applet (e.g., an editor component 402). In one example, the editor component 402 can cause provision of a graphical user interface within a browser, wherein at least one field of such interface enables a user to organize function blocks to effectuate a control or monitoring process with respect to the I/O module 108. The editor component 402 can be associated with a library of objects 404 that can be accessed by a user and positioned within the field in a manner desired by such user. While shown as being resident upon the network adaptor 104, it is understood that the library of objects 404 can be associated with any suitable data storage device that is communicatively coupled to the network adaptor 104. For instance, the library of objects 404 can be existent upon a server that is associated with the network adaptor 104.

In a detailed example, the library of objects 404 can be resident within a particular file (e.g., a jar file) that is delivered to a browser that is accessing the network adaptor 104. A Java plug-in, for instance, can then be employed to unzip the file to access executable object class files. Therefore, sets of objects can be zipped in appropriate files and correctly referenced regardless of their location. It is to be understood, however, if the file that includes the library of objects 404 is not resident upon the network adaptor 104, a client would need appropriate client software, have knowledge of how to retrieve the library of objects 404, and be appropriately coupled to a server that includes the library of objects 404.

As stated above, a user can select and arrange function objects in a manner of their choosing to effectuate a desired monitoring/control outcome with respect to the I/O module 108. Some objects within the library of objects 404, however, may not have been purchased at the time the system 400 was purchased. Due to changing needs of a user, however, function objects within the library of objects 404 not initially needed by a user may later be desired. Thus, the user can purchase additional objects through a transaction component 406, which can be resident upon the network adaptor 104. For instance, the user can select a desired object and be provided with an option to purchase the selected object. Moreover, the user can be provided with several payment options, including paper billing, instant payment by way of credit card, charge to an existing account, and the like. Upon purchasing one or more desired objects form the library of objects 404 by way of the transaction component 406, the user can arrange the purchased object(s) through the editor component 402. The user can then request that an HTML page be built given the arrangement of function blocks. The built HTML page can then be launched and/or accessed at a later time by the user. The instantiated objects 110 within the web page 106 can be executed, which performs monitoring and/or control actions with respect to the I/O module 108.

Figure 5:
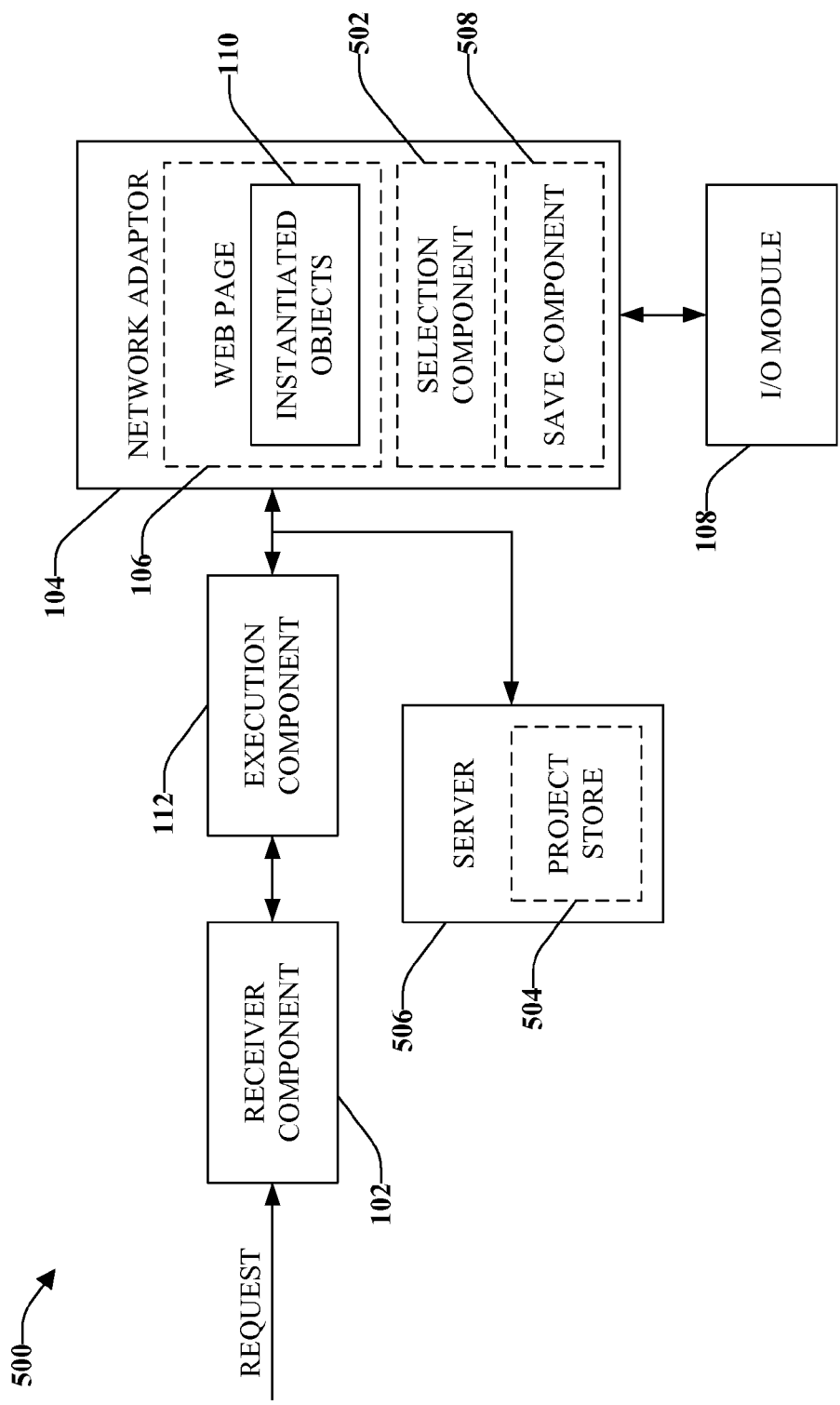
FIG. 5 illustrates a system for saving a generated Netlist to an appropriate project on a network drive.

Referring now to FIG. 5, a system 500 that enables a project to be selected and utilized in connection with monitoring/controlling the I/O module 108 is illustrated. The system 500 includes the receiver component 102 that receives a request for a homepage of the network adaptor 104 (through use of a browser). Upon being provided the homepage, the initiator of the request can select one or more projects associated with the I/O module 108 by way of a selection component 502 running as part of an editor applet. For instance, a plurality of existing projects can be resident within a project store 504 upon a local drive or network server 506 that is communicatively coupled to the network adaptor 104. The user can select a desired project from the project store 504 by way of the selection component 502. In another example, the selection component 502 can be employed to create a new project.

Upon the selected project (or a new project) being loaded into the homepage of the network adaptor 104, the editing applet can graphically arrange and interconnect function blocks in a desired manner. This graphical arrangement of function blocks can be saved as a project, for retrieval at a later time, on the local drive or a network server 506. In addition, the project can be built into an HTML page including a netlisted collection of applets. A save component 508 can then be employed to archive the web page 106 in a desired project folder on the local drive or the network server 506 within the project store 504. The web page 106 is also saved at the network adaptor 104, thereby enabling an initiator of a request to directly access the web page 106 at the network adaptor 104. In still another example, the initiator of the request can access shortcuts on the user's desktop to various HTML Netlists resident on the network adaptor 104. Such web page 106 can be executed by the execution component 112 and the executing instantiated objects 110 can be employed to monitor and/or control the I/O module 108.

Figure 6:
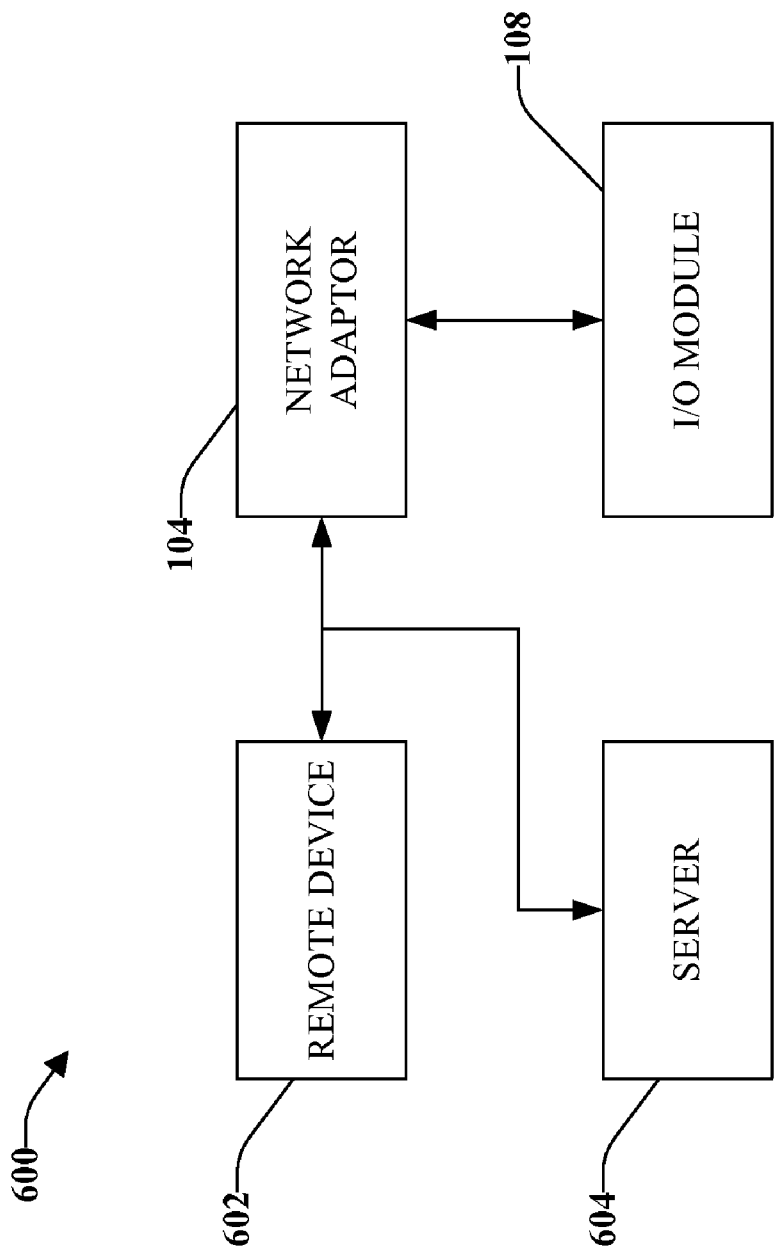
FIG. 6 illustrates a remote monitoring and/or control system with respect to an I/O module.

Turning now to FIG. 6, a system 600 that facilitates web-based control of the I/O module 108 from a remote location is illustrated. The system 600 includes a remote device 602, such as a laptop computer, a desktop computer, a personal digital assistant, a cellular telephone, or any other suitable device that can be communicatively coupled to the network adaptor 104. The system 600 further includes a server 604, which can be a file server, a server associated with a particular company, etc. In a particular example, a web browser can be initiated at the remote device 602 and directed to a homepage associated with the network adaptor 104 (which may be an Ethernet interface card). The network adaptor 104 can then provide the remote device 602 with an editor applet that enables a user of the remote device 602 to create/open/edit/save a project that can be used to build an HTML Netlist that is then employed to monitor and/or control aspects associated with the I/O module 108. The editor applet can appear in a frame of the homepage of the network adaptor 104. The homepage can further include one or more depressible (graphical) buttons that enables a project resident upon the server 604 to be opened. Thus, the remote device 602 can access any project that is saved on one or more file servers throughout the world (if security requirements are met).

Function blocks can be edited, arranged, and the like through employment of the editor applet, and once editing is complete, the project can be saved upon the server 604 (this file server may be on the local drive—hard drive, flash drive, etc.—or other suitable network drive). Once the project is saved, an HTML file with instantiated function blocks therein can be built (e.g., an HTML Netlist). The HTML file can be saved in the server 604 and/or within the network adaptor 104. Thereafter the HTML file can be launched as an HTML web page from the network adaptor 104 and the function objects (applets) instantiated within such web page can be executed. The applets within the HTML web page can be executed individually and separately. In other words, the applets are not forced to execute in a particular sequence. Rather, they execute according to relationships between inputs and outputs of the function blocks. The web page can then be employed to exchange data between the network adaptor 104 and the I/O module 108. Thus, as described above, a conversion mechanism can be employed for a web to industrial automation protocol (e.g., CIP) conversion. If function blocks instantiated within the web page are directed to read/write data residing within that web page, such data can be retrieved/saved from/to the project directory upon the server 604. Upon creation of the web page, such web page can be launched by directing a browser to the web page on the network adaptor 104 indirectly via the homepage associated with the network adaptor 104 (e.g. the editor) or directly using a shortcut on the user's desktop.

Referring to FIGS. 7-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
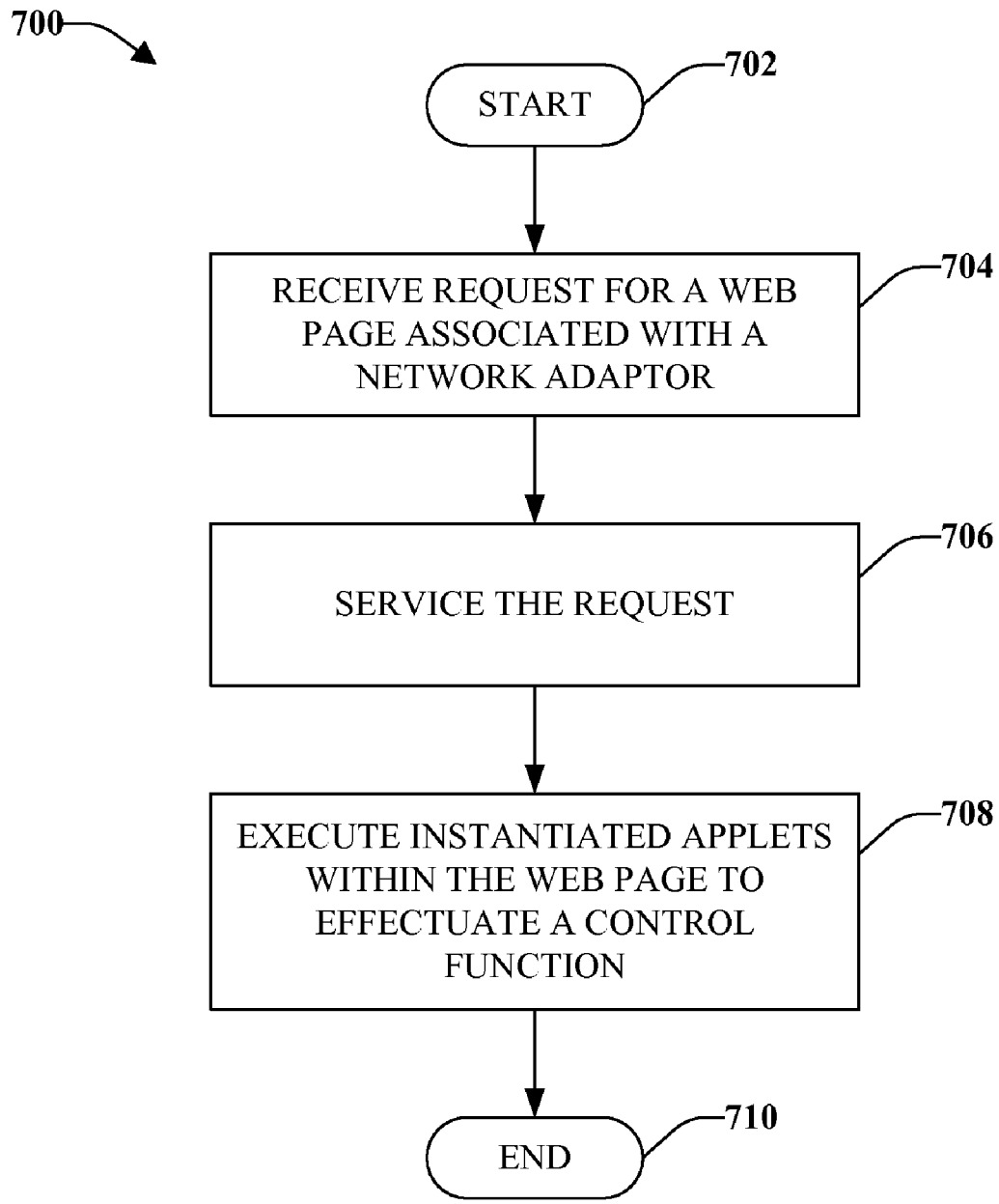
FIG. 7 is a representative flow diagram illustrating a methodology for executing instantiated objects within a web page to monitor and/or control an I/O module.

Turning specifically to FIG. 7, a methodology 700 for remotely monitoring an I/O module and/or remotely controlling an I/O module is illustrated. The methodology 700 initiates at 702, and at 704 a request for a web page associated with a network adaptor is received. For instance, the request can be generated through a VPN and directed towards the network adaptor that includes the web page. In still another example, the requested web page can be automatically launched after completion of editing a project. At 706, the request for the web page is serviced (e.g., the browser is populated with the requested web page). At 708, instantiated applets within the web page are executed to effectuate a control function (which can be data monitoring, controlling a process, . . . ). The instantiated applets can then run and, if desired, write data to a network drive. The applets can be associated with one or more conversion functionalities, thereby enabling the web page to exchange data with the I/O module. The methodology 700 completes at 710.

Figure 8:
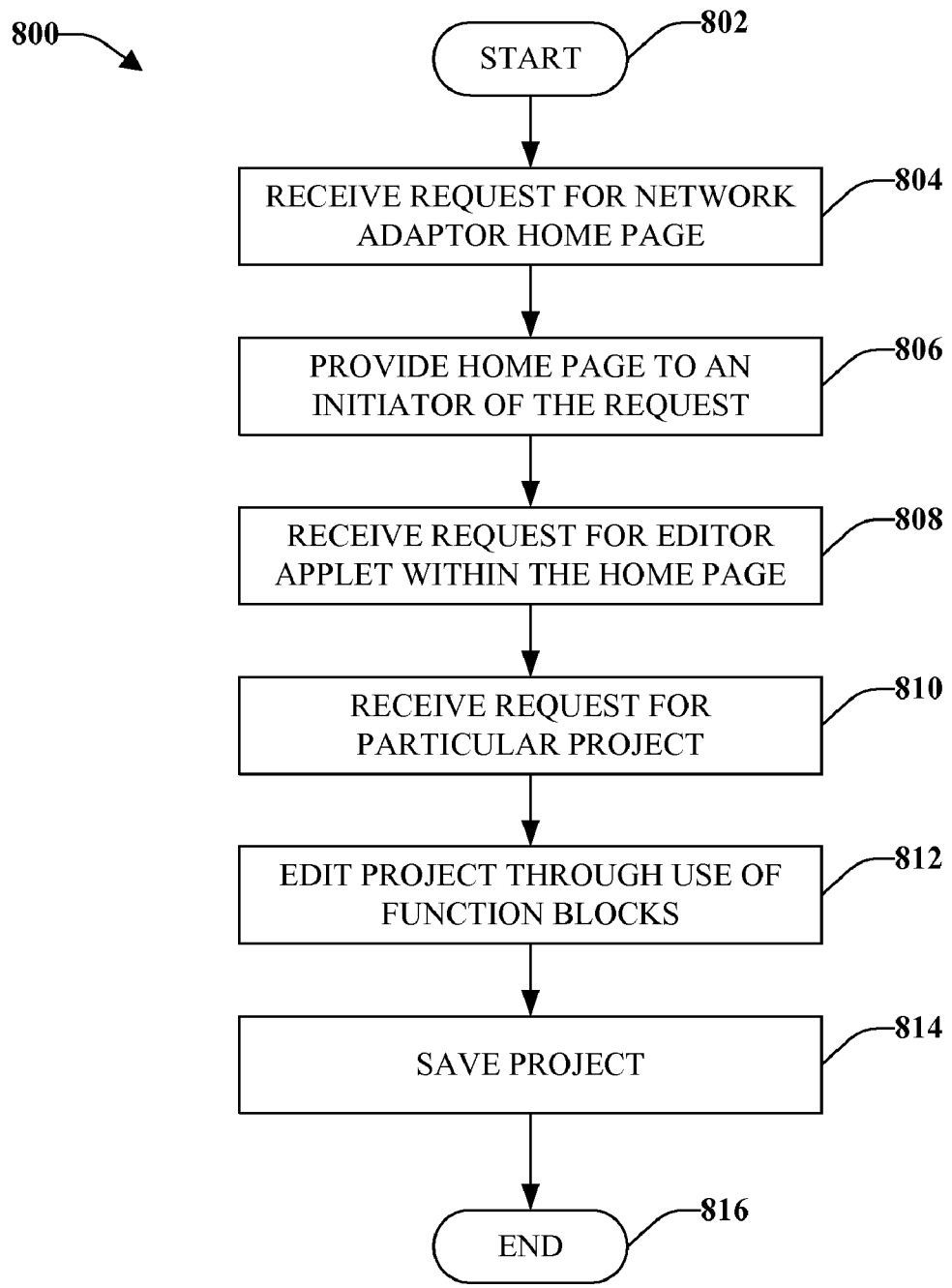
FIG. 8 is a representative flow diagram illustrating a methodology for selecting and saving an industrial automation project.

Referring now to FIG. 8, a methodology 800 for creating and saving a project file for use in connection with controlling/monitoring an I/O module is illustrated. The methodology 800 initiates at 802, and at 804 a request is received for a homepage associated with a network adaptor. For example, a browser can be directed to the homepage of the network adaptor. The device that includes the browser can be located at any suitable location where a network connection to the network adaptor can be created and maintained. For instance, the device that initiates the request can be on a first continent while the network adaptor and/or the I/O module can be resident upon a second continent. At 806, the requested homepage is provided to the initiator of the request. The homepage, for example, can include various selectable icons that facilitate access to one or more projects, and the like. At 808, a request for an editor applet within the homepage is received. For example, a pointing and clicking mechanism, a series of keystrokes, or the like can be employed to request the editor applet.

Once the editor applet is received, at 810 a request for a particular project is received. The project can be requested from a local or network drive or a new project can be requested. At 812, the requested project is edited through employment of one or more function blocks. For instance, a frame can be provided that enables selection, editing, wiring and placement of one or more function objects. At 814 the requested project is saved on the local or network drive. The project can then be retrieved at a later time for editing and subsequent rebuild and execution. The methodology 800 then completes at 816.

Figure 9:
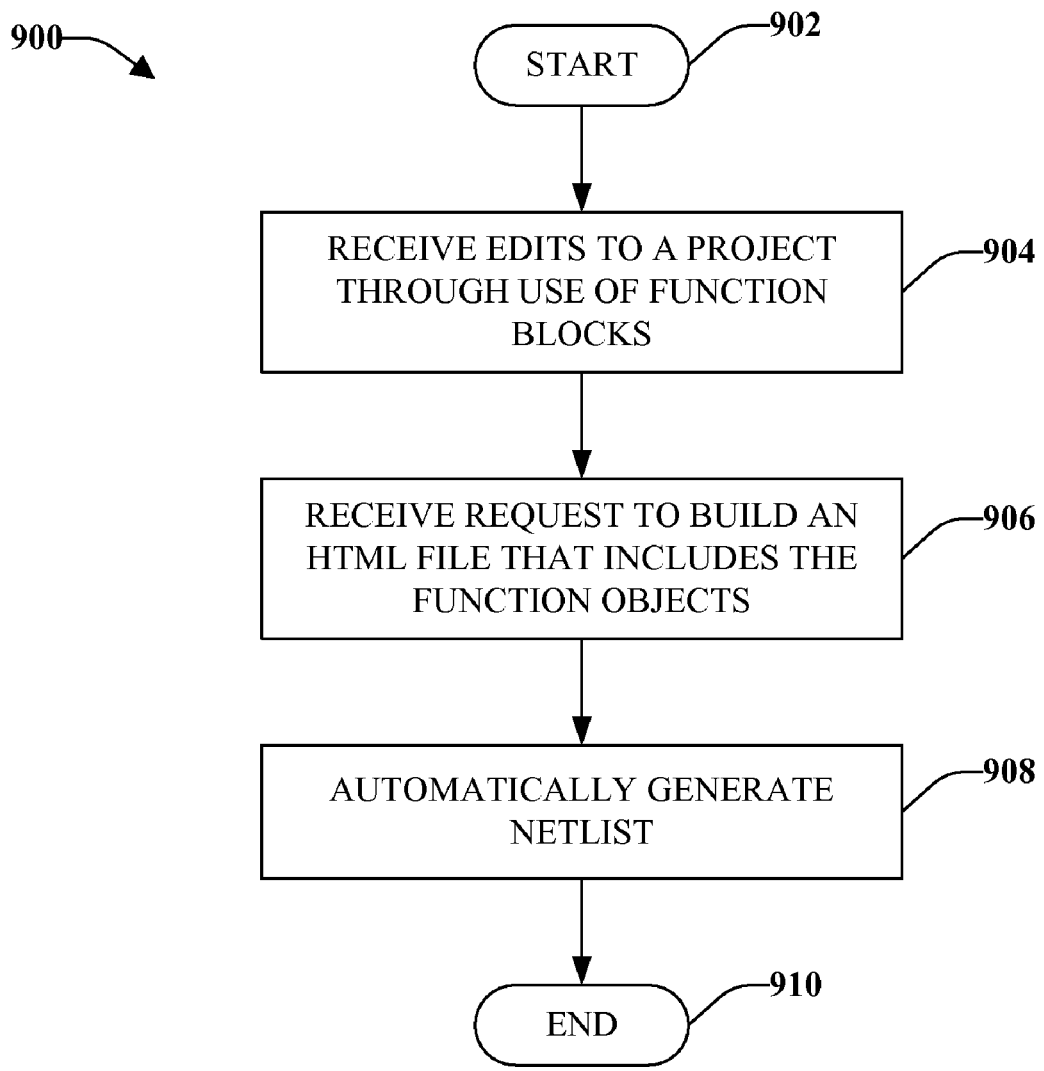
FIG. 9 is a representative flow diagram illustrating a methodology for automatically building a Netlist based upon an arrangement of graphical function objects.

Referring now to FIG. 9, a methodology 900 for automatically creating an HTML Netlist that can be employed to control or monitor an I/O module is illustrated. The methodology 900 starts at 902, and at 904 edits to a project are received through employment of function blocks. For example, content of the function blocks can be edited and/or function blocks can be arranged in a manner desired by a user. The editor that enables the editing of function blocks can be existent on a network adaptor, and an initiator of the request can be resident remotely from the network adaptor. At 906, a request to build an HTML file (Netlist) is received, wherein the built file can include instantiations of the function objects as applets. At 908, the HTML file (Netlist) is generated according to the request. Such file can then be employed to monitor and/or control at least one I/O module. The methodology 900 completes at 910.

Figure 10:
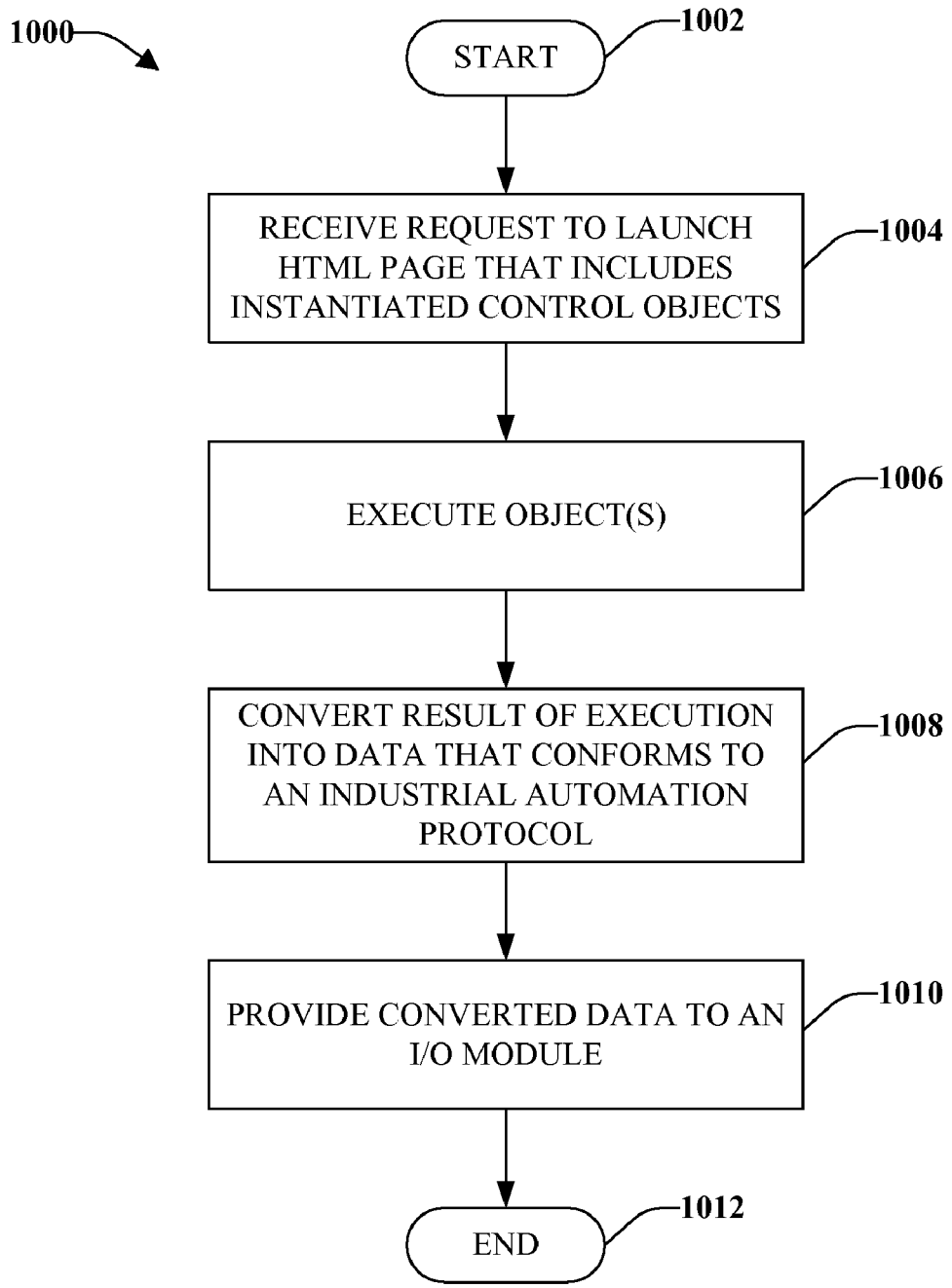
FIG. 10 is a representative flow diagram illustrating a methodology for converting data between a web-based protocol and an industrial automation protocol.

Turning now to FIG. 10, a methodology 1000 for monitoring data associated with an I/O module and/or controlling an I/O module is illustrated. The methodology 1000 begins at 1002, and at 1004 a request is received to launch an HTML page that includes instantiated control objects. For example, a browser can be directed towards the HTML page (for example, by way of a shortcut on a user's desktop). Similarly, a homepage associated with a network adaptor can be accessed by way of a browser, and the HTML file can be opened from such homepage. Any suitable manner of receiving the request is contemplated by the inventor and intended to fall within the scope of the hereto-appended claims. At 1006, the instantiated objects within the HTML page are executed. Such objects can operate individually and according to a manner in which function blocks were graphically arranged. At 1008, result of execution is converted into data that conforms to an industrial automation protocol, such as CIP. At 1010, the converted data is provided to an I/O module such that the I/O module can receive and interpret the data. The conversion can also occur in reverse. In other words, data form the I/O module can be converted to a web-based format to enable monitoring of such data upon the HTML page. The methodology 1000 then completes at 1012.

Figure 11:
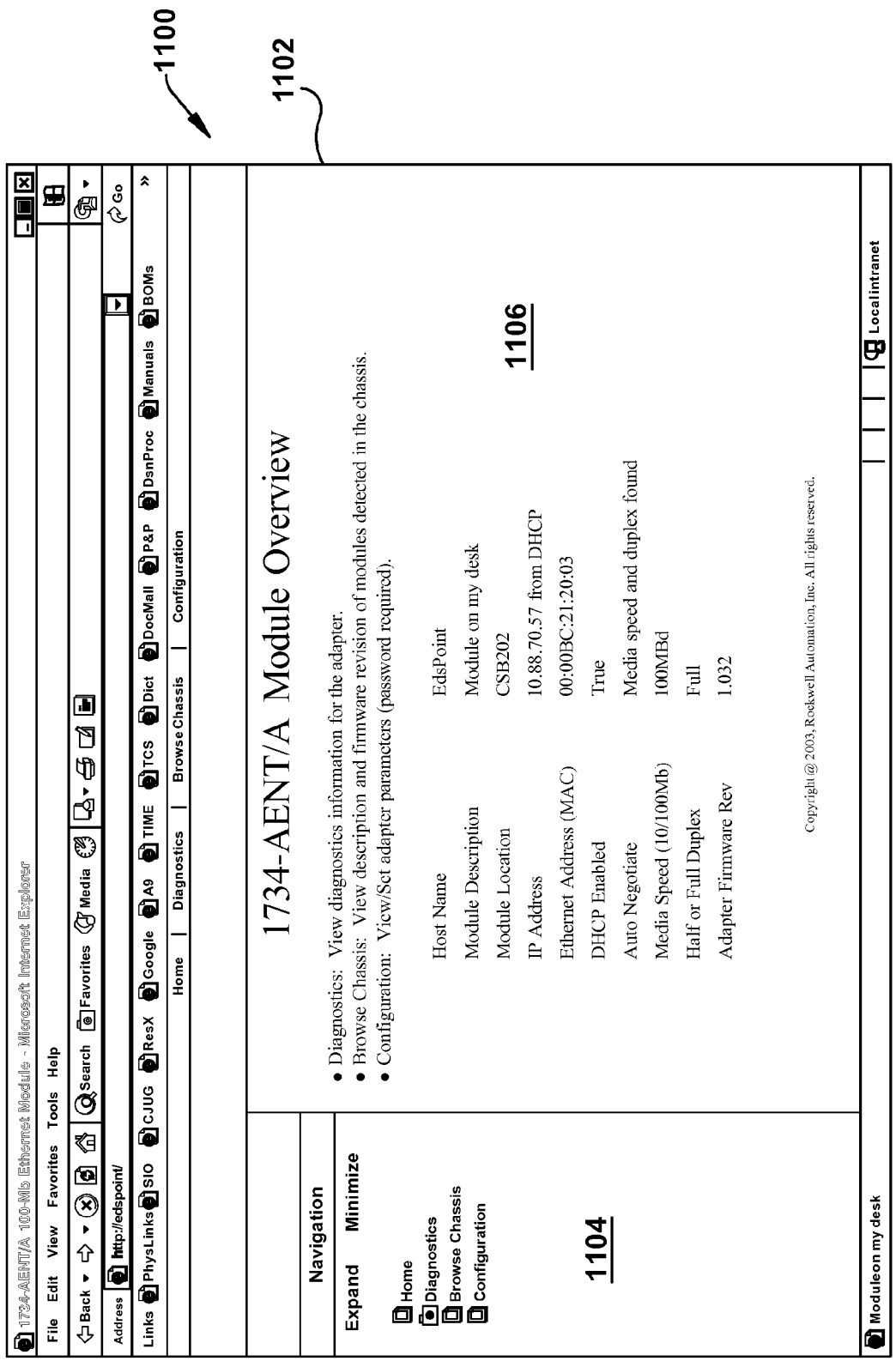
FIG. 11 is a screenshot of a homepage associated with a network adaptor.

Now referring collectively to FIGS. 11-17, screenshots that illustrate one or more aspects described herein are provided. It is understood that such screen shots are exemplary in nature and are not intended to limit the claimed subject matter to embodiments shown in the screen shots. Turning specifically to FIG. 11, a screenshot 1100 illustrating a homepage 1102 for a network adaptor is illustrated. The homepage 1102 can include multiple frames 1104 and 1106, wherein selection of a link in the frame 1104 can cause disparate information to appear in the frame 1106. In the screenshot 1104, a link relating to diagnostics has been selected in the frame 1104, thus causing diagnostic information relating to the network adaptor to be displayed in the frame 1106.

Figure 12:
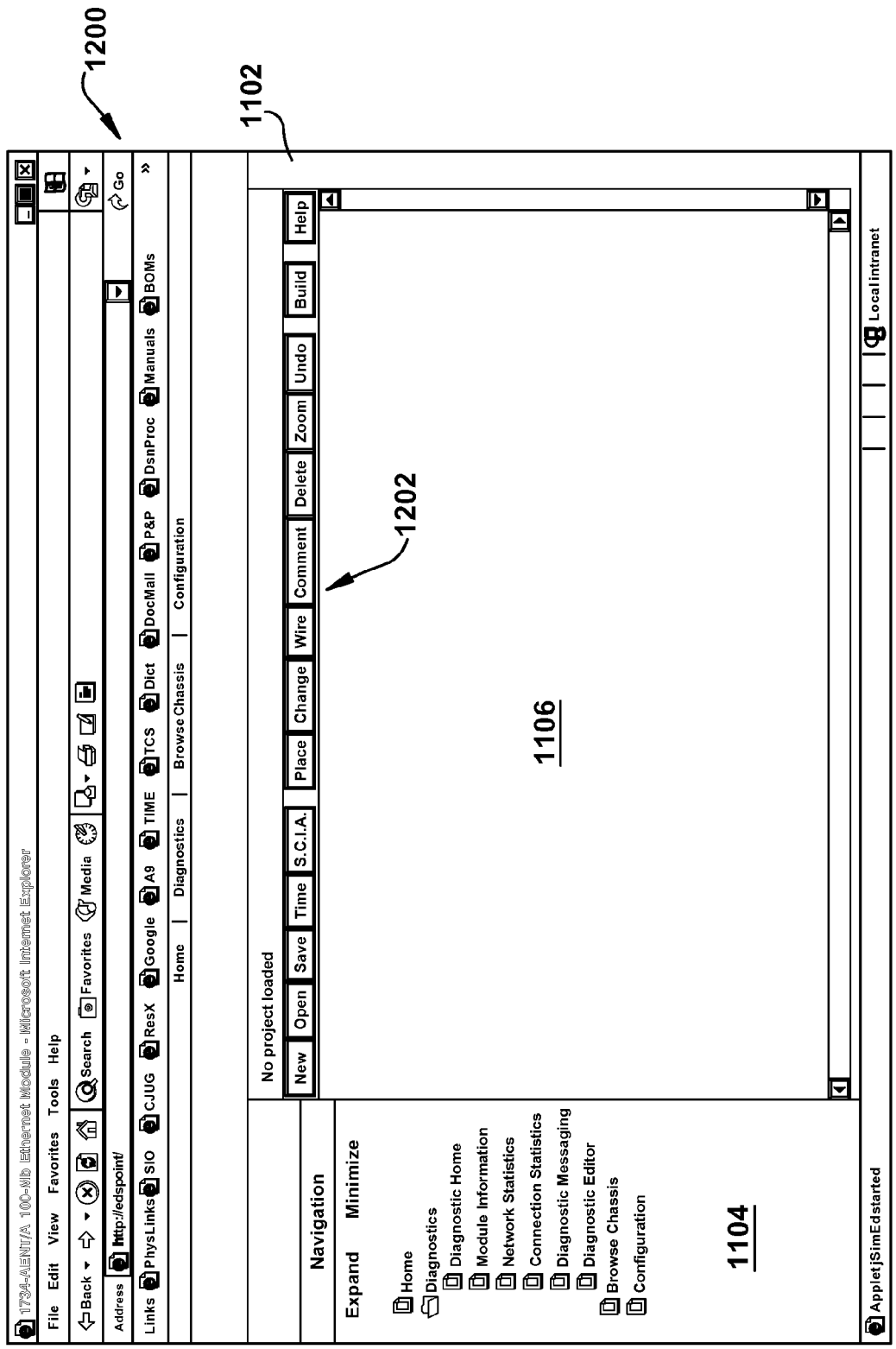
FIG. 12 is a screenshot of an editor applet within a homepage of a network adaptor.
Figure 13:
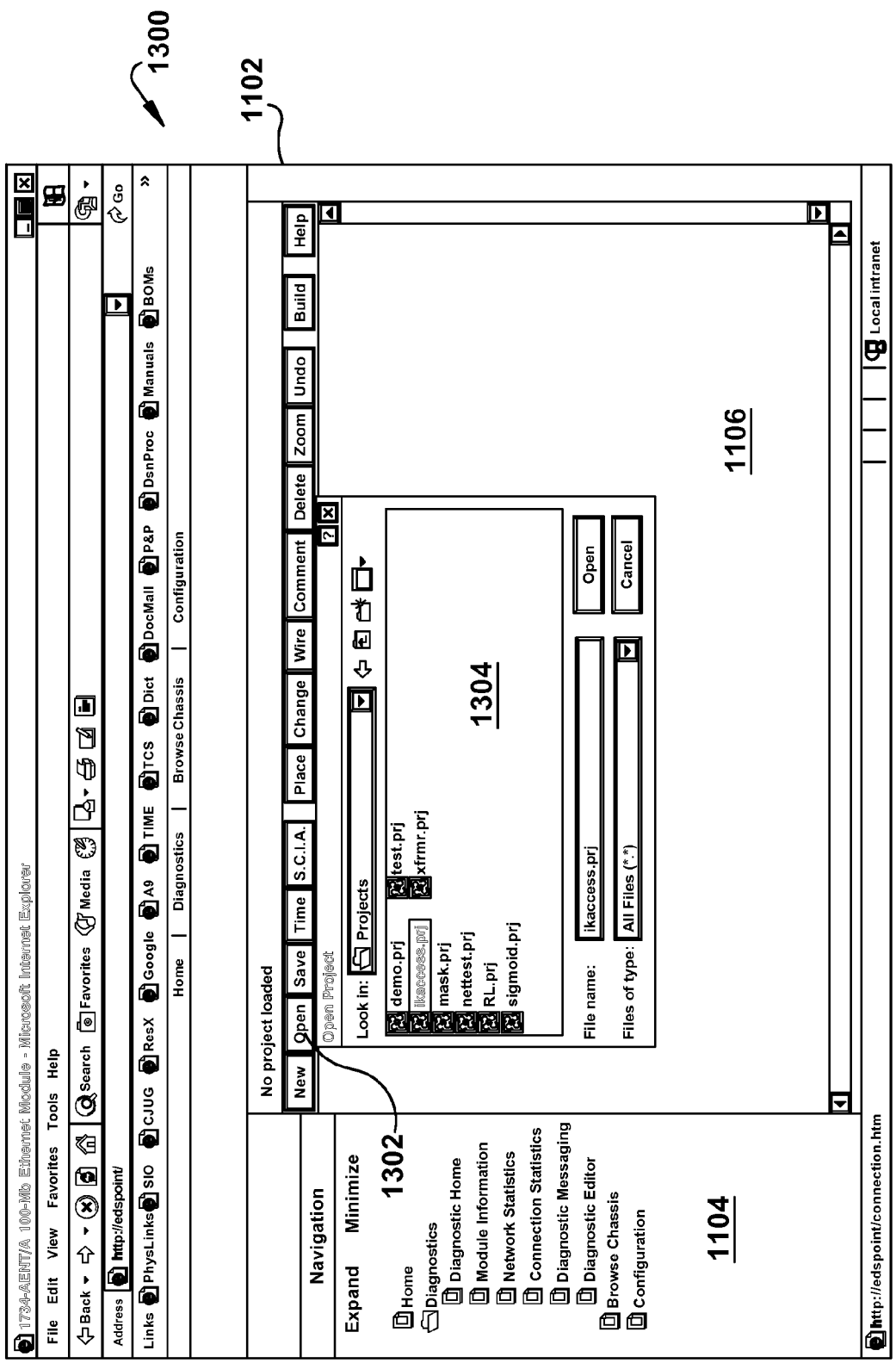
FIG. 13 is a screenshot illustrating selection of a project, contents of the project can be edited through employment of an editor applet.

Turning now to FIG. 12, a screenshot 1200 of the homepage 1102 populated with an editor applet is illustrated. The editor applet can be enabled by selecting a particular link within the frame 1104. The editor applet can be provided in the frame 1106, and can include several buttons 1202 that can be depressed by a user. For instance, at least one of such buttons can relate to opening a project, starting a new project, saving a project, placing function blocks, and various other functionalities. Referring now to FIG. 13, a screenshot 1300 illustrating selecting of a button within the editor that enables opening of a particular project is illustrated. In more detail, an "open" button 1302 can be selected by a user through a pointing and clicking mechanism, for example. The screenshot 1300 illustrates a frame 1304 that is provided after the button 1302 is selected, wherein a list of available projects are available for selection.

Figure 14:
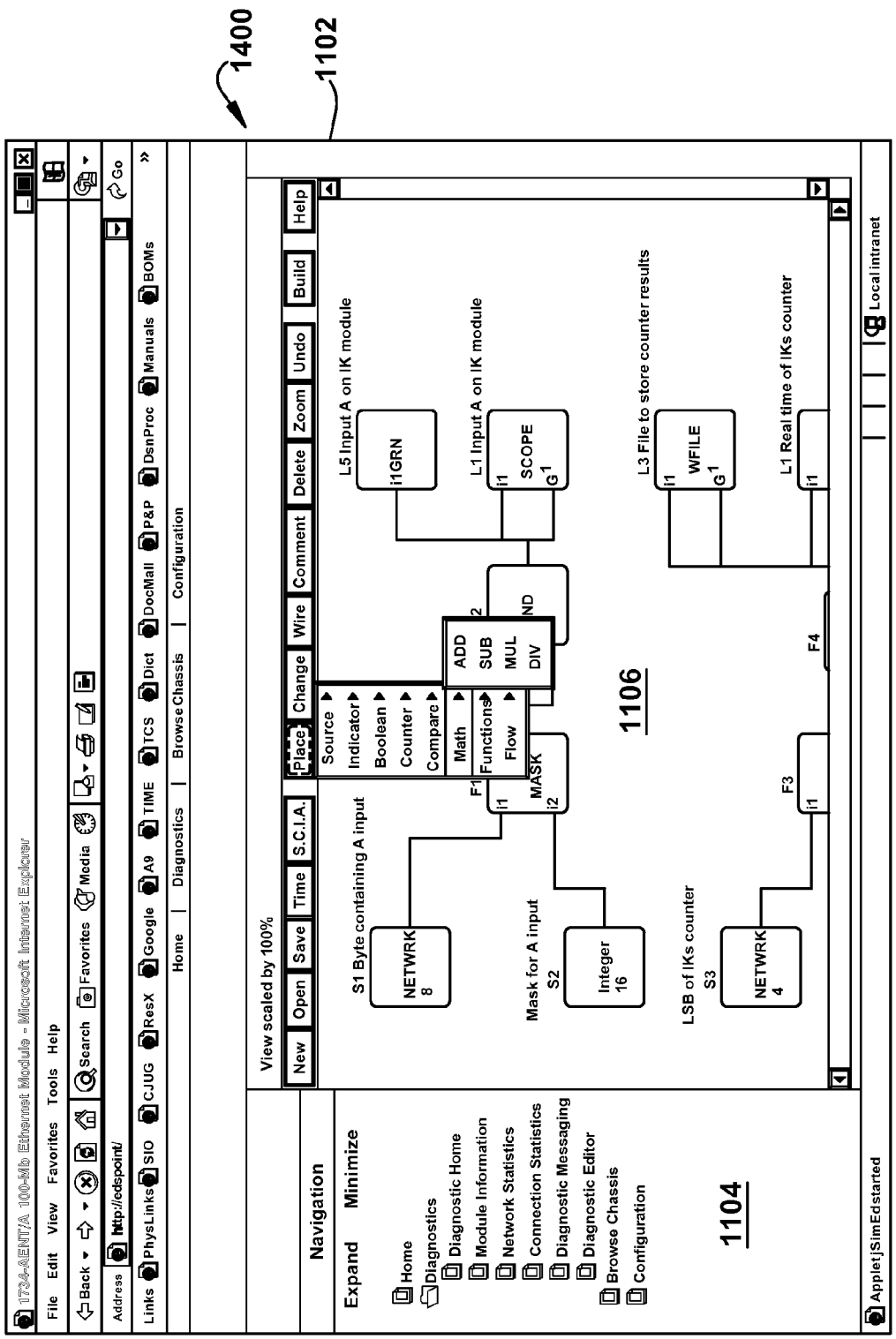
FIG. 14 is a screenshot illustrating arranging function objects for utilization in remotely controlling an I/O module.
Figure 15:
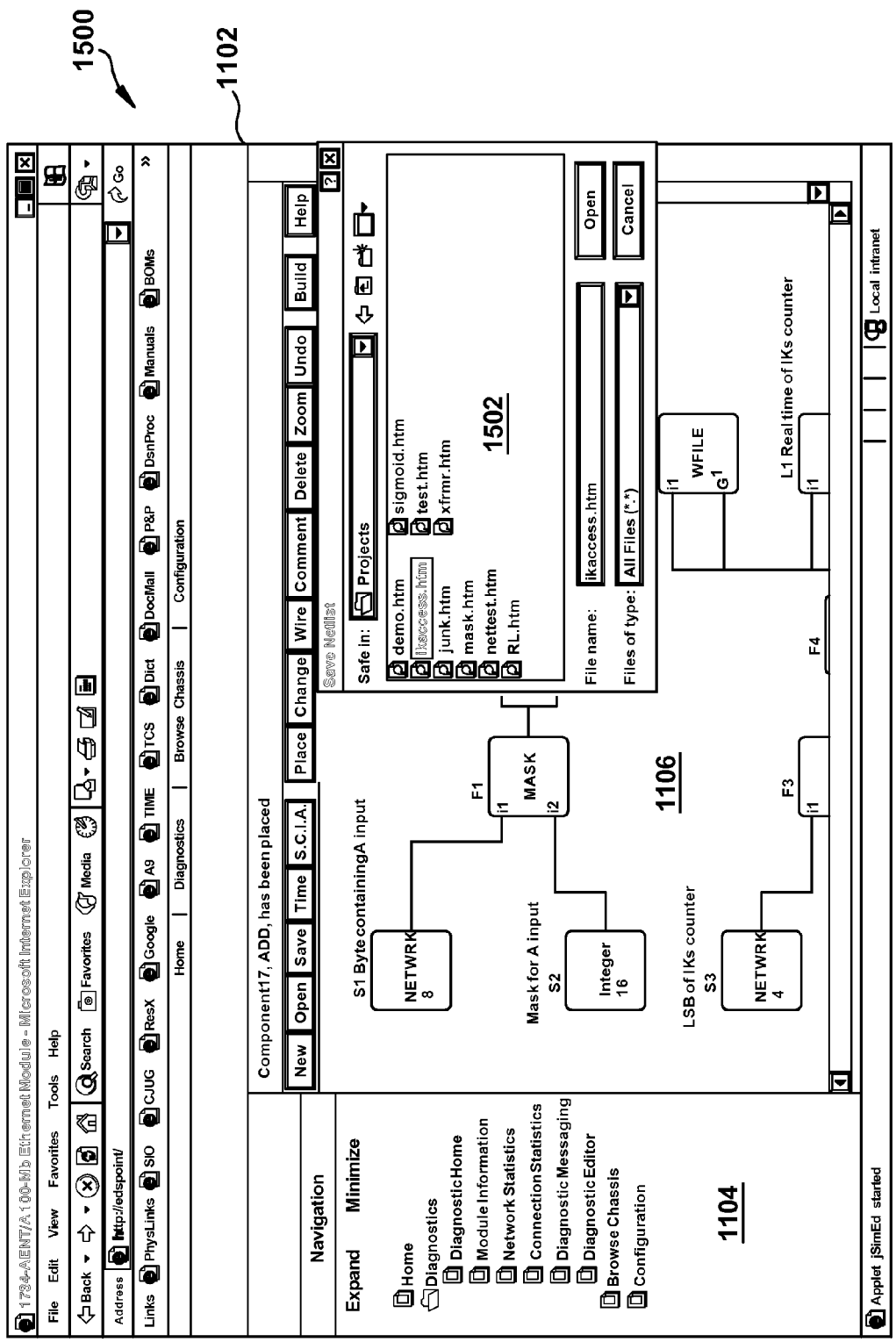
FIG. 15 is a screenshot illustrating building of a Netlist from an arrangement of function objects.

With reference to FIG. 14, a screenshot 1400 illustrating use of an editor to select, place, and wire one or more function blocks is illustrated. Selection of a particular button enables one of a plurality of function blocks to be selected. Upon selection of a desirable function block, such block can be placed and organized according to a user's desires. As described above, these function blocks can be applets that will run independent of one another. Turning briefly to FIG. 15, a screenshot 1500 illustrating building of a Netlist from the arrangement of function blocks is illustrated. For example, a button can be depressed by a user that initiates a build of the Netlist. A frame 1502 can be provided that enables a user to select a name for the built Netlist. Similarly, while not shown within the screenshot 1500, the project associated with the to-be-built Netlist can also be saved (at a server).

Figure 16:
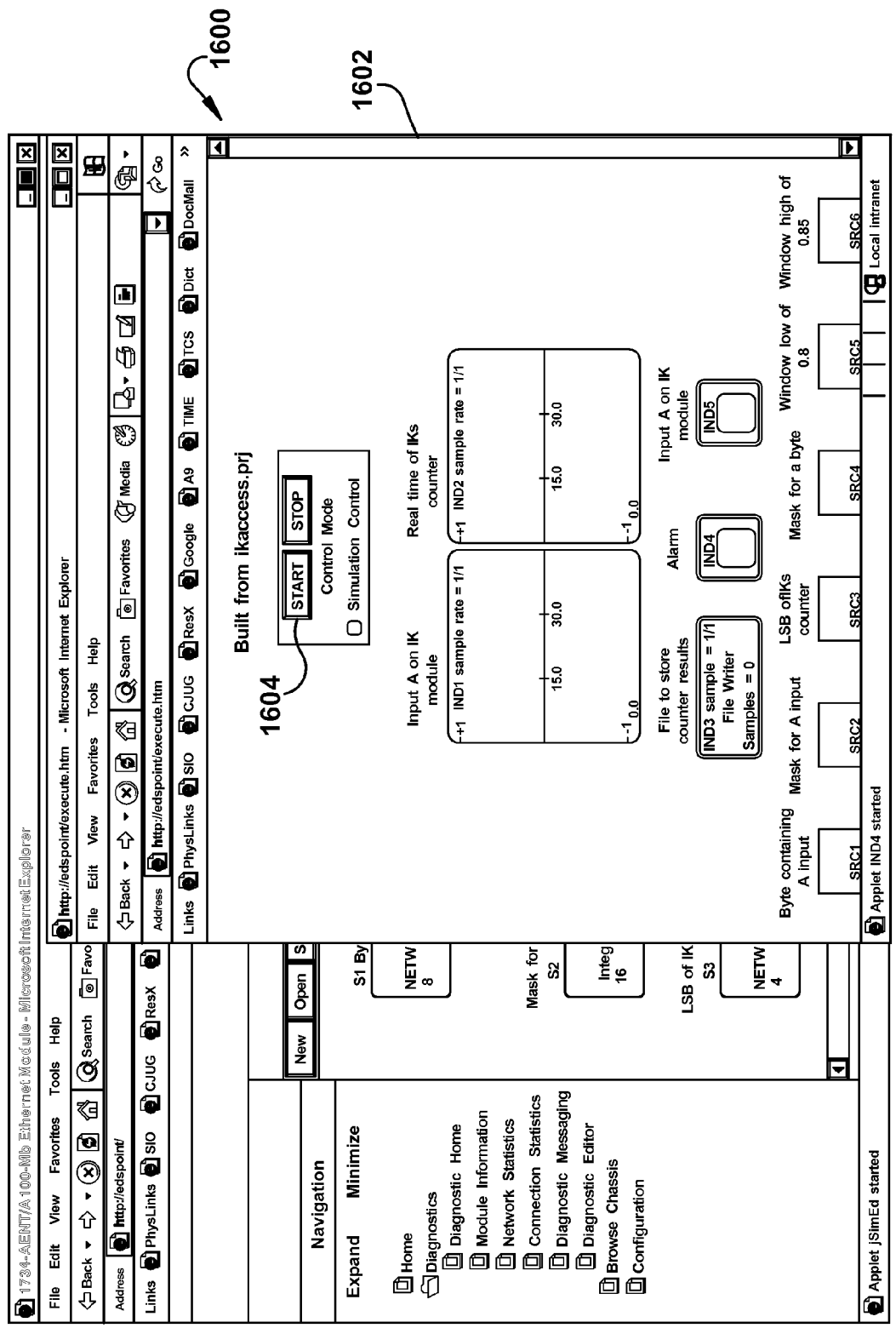
FIG. 16 is a screenshot of an HTML page that can be employed to monitor and/or control an I/O module.
Figure 17:
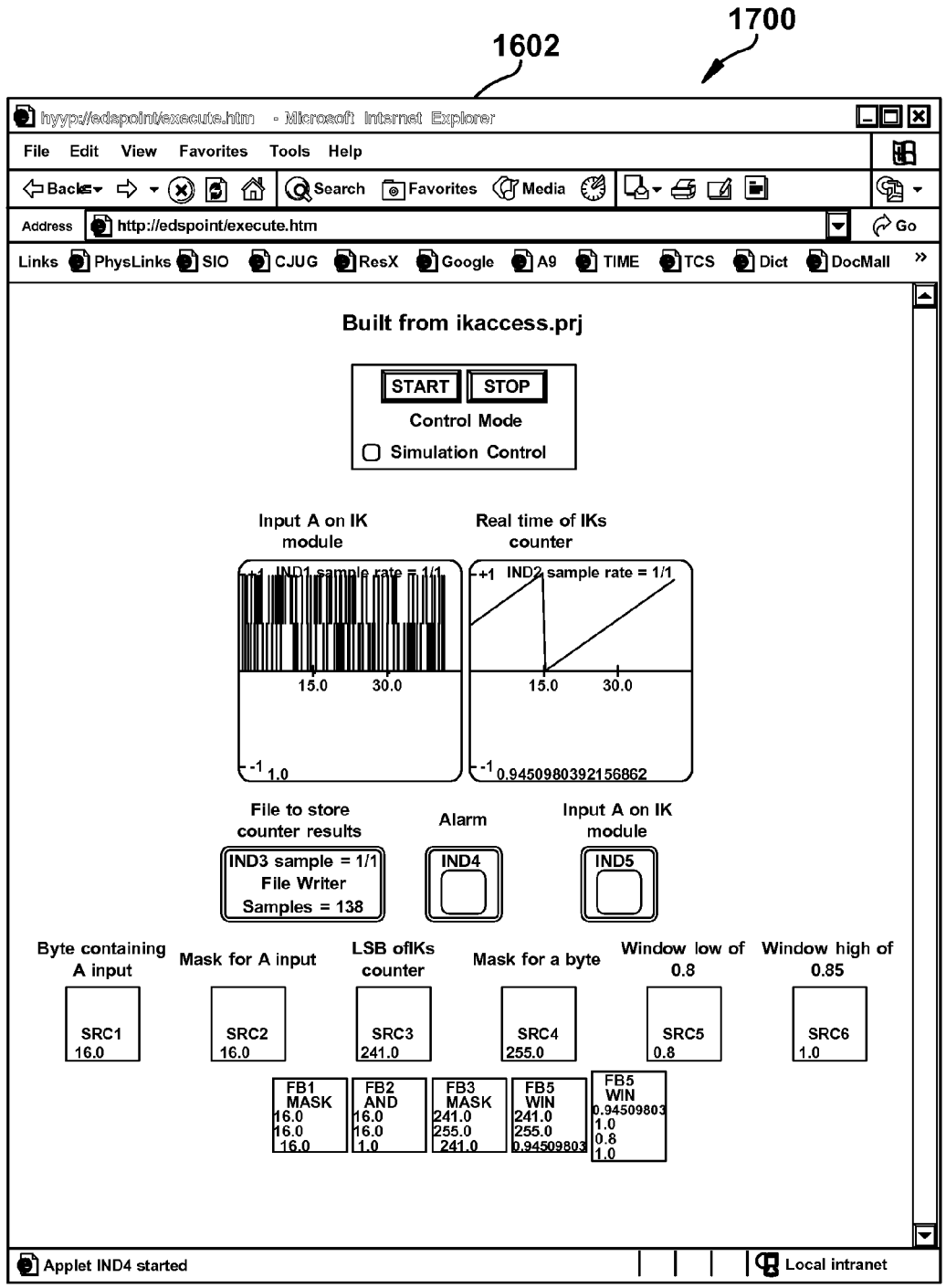
FIG. 17 is a screenshot of an executing HTML page utilized to monitor and/or control an I/O module.

Referring now to FIG. 16, a screenshot 1600 of an HTML page 1602 resulting from the build is illustrated. The screenshot 1600 includes graphical entities selected by a user and is designed to monitor data according to the arrangement of function blocks described above. Upon selection of a button 1604, the instantiated objects can begin executing. Turning now to FIG. 17, a screenshot 1700 of the HTML page 1602 during execution of the instantiated objects is illustrated. In the example shown below, the I/O module monitored through the HTML page produces a continuous series of incremental count values. The function blocks were arranged to monitor the counts, and graphically display as much to the user. Furthermore, various comparisons can be made through use of the function blocks, and data can be directed to one or more particular files.

Figure 18:
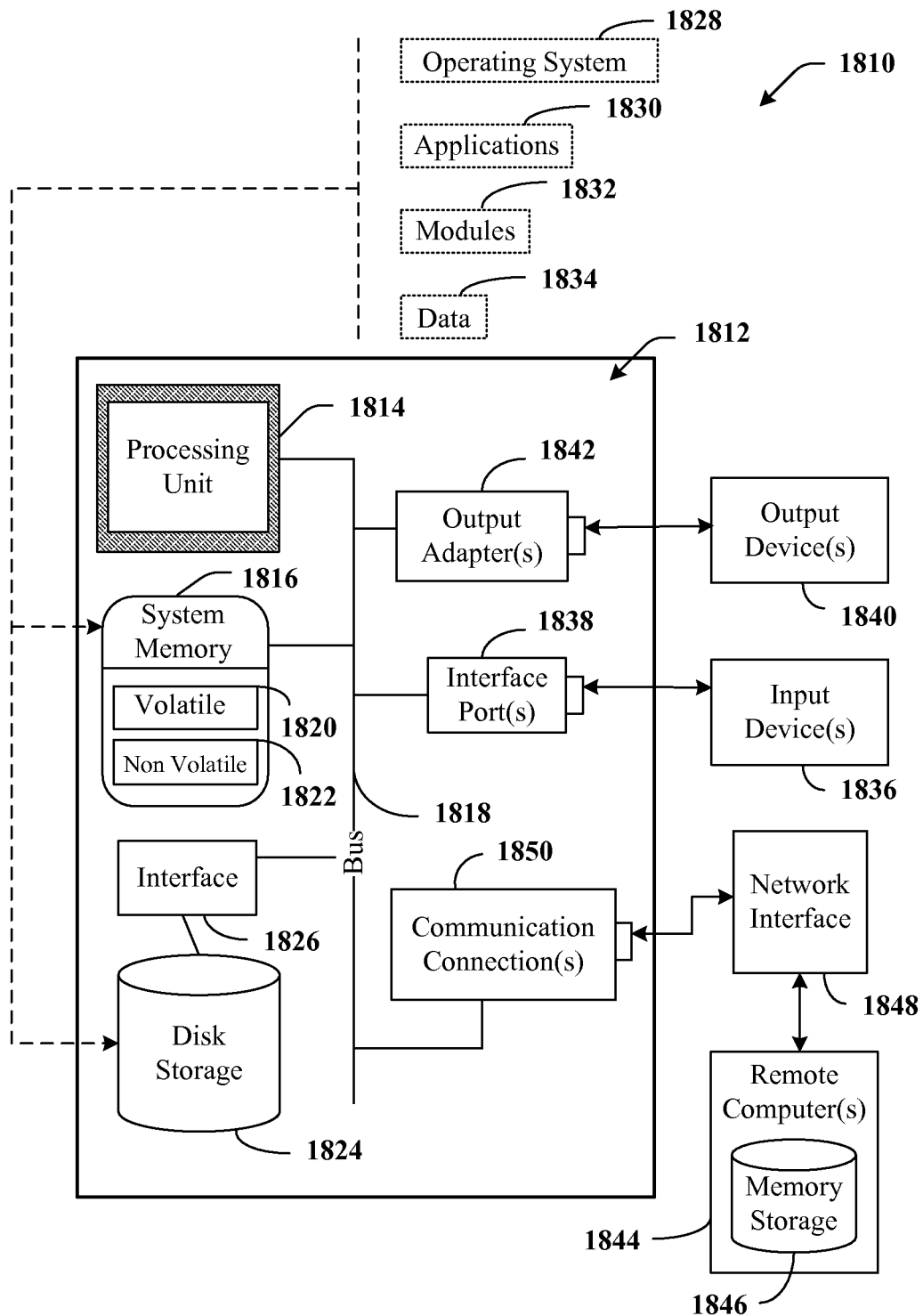
FIG. 18 is an exemplary computing environment that can be utilized in connection with the claimed subject matter.

With reference to FIG. 18, an exemplary environment 1810 for implementing various aspects of the invention includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/non-volatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the subject invention can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

Figure 19:
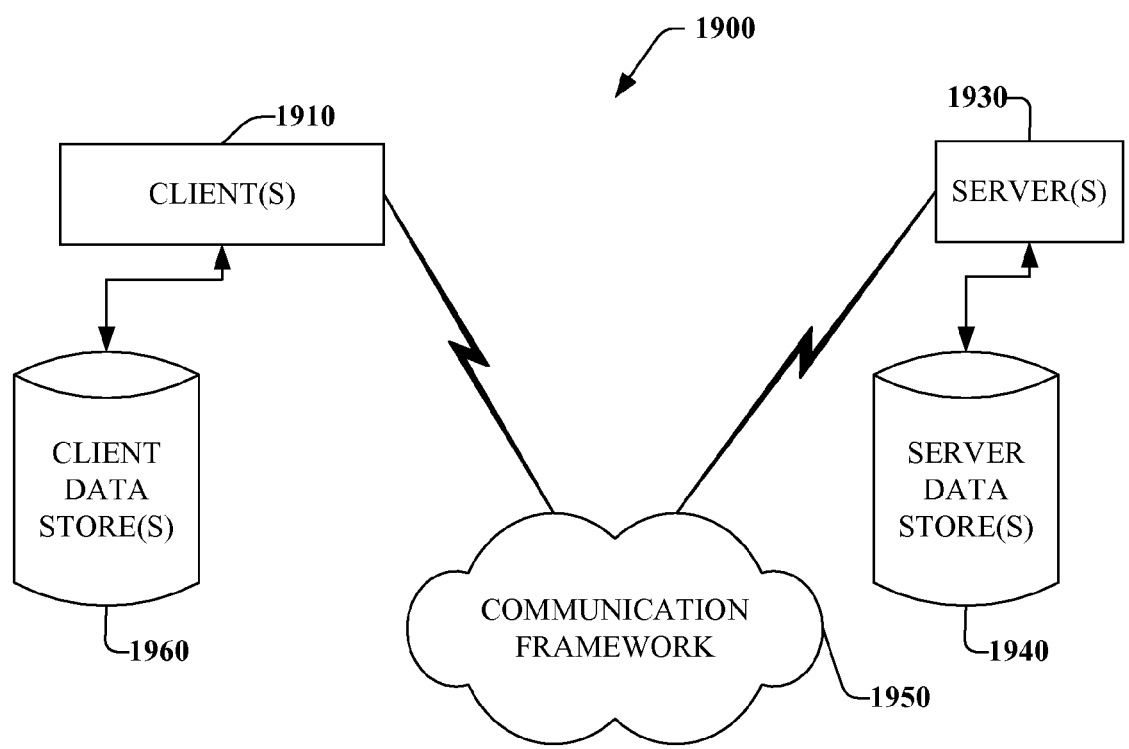
FIG. 19 is an exemplary computing configuration that can be utilized in connection with the claimed subject matter.

FIG. 19 is a schematic block diagram of a sample-computing environment 1900 with which the subject invention can interact. The system 1900 includes one or more client(s) 1910. The client(s) 1910 can be hardware and/or software (e.g., threads, processes, computing devices). The system 1900 also includes one or more server(s) 1930. The server(s) 1930 can also be hardware and/or software (e.g., threads, processes, computing devices). The servers 1930 can house threads to perform transformations by employing the subject invention, for example. One possible communication between a client 1910 and a server 1930 can be in the form of a data packet adapted to be transmitted between two or more computer processes. The system 1900 includes a communication framework 1950 that can be employed to facilitate communications between the client(s) 1910 and the server(s) 1930. The client(s) 1910 are operably connected to one or more client data store(s) 1960 that can be employed to store information local to the client(s) 1910. Similarly, the server(s) 1930 are operably connected to one or more server data store(s) 1940 that can be employed to store information local to the servers 1930.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

APPENDIX A

```
<html>
<body>
<p align="center"><font size="4">Built from nettest.prj</f></p>
<div align="center">
<p align="center">
<applet code="Comm.class" archive="SimEngine.jar" width=150
height=70
name="Comm">
```

APPENDIX A-continued

```
    <param name="maxsrcs" value="3">
    <param name="maxfbs" value="2">
    <param name="maxinds" value="0">
    <param name="maxcnas" value="0">
    <param name="maxpnas" value="0">
    <param name="netaddr" value="1.4.101.3">
</applet>
</p>
<table>
<tr>
<td width="100"><p align="center"><font size="2"></f></p></td>
<td width="100"><p align="center"><font size="2"></f></p></td>
<td width="100"><p align="center"><font size="2"></f></p></td>
</tr>
<tr>
<td><p align="center">
<applet code="SRC.class" archive="SimEngine.jar" width=50 height=50
name="SRC1">
    <param name="function" value="V_P=8">
</applet>
</p></td>
<td><p align="center">
<applet code="SRC.class" archive="SimEngine.jar" width=50 height=50
name="SRC2">
    <param name="function" value="K_I=16">
</applet>
</p></td>
<td><p align="center">
<applet code="SRC.class" archive="SimEngine.jar" width=50 height=50
name="SRC3">
    <param name="function" value="V_B=1">
</applet>
</p></td>
</tr>
</table>
<table>
<tr>
<td><p align="center">
<applet code="FB.class" archive="SimEngine.jar" width=50 height=50
name="FB1">
    <param name="function" value="MASK">
    <param name="input1" value="SRC1">
    <param name="pin1" value="1">
    <param name="input2" value="SRC2">
    <param name="pin2" value="1">
</applet>
</p></td>
<td><p align="center">
<applet code="FB.class" archive="SimEngine.jar" width=50 height=50
name="FB2">
    <param name="function" value="UCNT">
    <param name="input1" value="FB1">
    <param name="pin1" value="1">
    <param name="input2" value="SRC3">
    <param name="pin2" value="1">
</applet>
</p></td>
</tr>
</table>
</div>
<p align="center">
<applet code="1App.class" archive="SimEngine.jar" width=0 height=0
name="1APP">
</applet>
</p>
</body>
</html>
```

What is claimed is:

1. A computer-implemented system to facilitate industrial automation monitoring or control, comprising:
    at least one processor coupled to a memory, the processor executes:
    a receiver component that receives a request for a web page associated with a network adaptor;
    an execution component that executes instantiated objects within the web page to effectuate at least one of monitoring and control of an I/O module that is communicatively coupled to the network adaptor;

an editor component that enables creation of new objects or editing of instantiated objects;

a selection component that facilitates selection of a project associated with the instantiated objects;

a saving component that facilitates saving the instantiated objects with respect to a selected project on at least one of a local drive and a network server drive; and a transaction component that enables the selection and purchase of additional objects to be utilized by the editor component while creating or editing web pages.

2. The system of claim 1, the web page is an HTML web page.

3. The system of claim 1, the instantiated objects are applets that are interdependent upon one another.

4. The system of claim 1, the web page is dedicated to a network adaptor connected to multiple I/O modules.

5. The system of claim 1, further comprising a security component that ensures that an initiator of the request is authorized to execute the web page.

6. The system of claim 5, the security component utilizes at least one of a virtual private network (VPN) and a firewall to ensure that the initiator of the request is authorized to execute the web page.

7. The system of claim 5, the security component analyzes one or more of a username, password, personal identification number, and biometric indicia in connection with ensuring that the initiator of the request is authorized to execute the web page.

8. The system of claim 1, the instantiated objects include one of a counting object, a comparison object, a multiplier object, a divider object, an addition object, and a subtraction object.

9. The system of claim 1, further comprising a requestor component that requests a Java plug-in to execute the instantiated objects upon the receiver component receiving the request.

10. The system of claim 9, further comprising a converter component that converts results of the execution from data formatted in accordance with web protocols to data formatted in accordance with an industrial automation protocol.

11. The system of claim 10, the industrial automation protocol is the Common Industrial Protocol (CIP).

12. The system of claim 10, the industrial automation protocol is one of EthernetIP, DeviceNet, ControlNet, ProfiBus, and FieldBus.

13. The system of claim 1, further comprising a library of objects that are accessible through the editor component, the editor component employed to instantiate a subset of objects within the library of objects within a project.

14. The system of claim 1, the editor component is accessible by way of a web page dedicated to the network adaptor.

15. The system of claim 1, further comprising a compiler component that automatically generates an HTML file, the requested web page is the HTML file.

16. A method for remotely monitoring or controlling an I/O module comprising the following computer-executable acts:

providing a homepage with respect to a network adaptor, the homepage is accessible by way of the Internet and the network adaptor is configured to communicate with the I/O module;

providing an editor applet within the homepage;

automatically creating an HTML Netlist of functional objects provided to the editor applet, the Netlist configured to at least one of control and monitor the I/O module, where the HTML Netlist conveys relationships between the functional objects;

saving the created HTML Netlist in a project file format for later selection on at least one of a local drive and network drive; and purchasing additional functional objects for use by the editor applet for at least one of creating or editing web pages.

17. The method of claim 16, the functional objects include one or more of a comparison object and a mathematical operator object.

18. The method of claim 16, further comprising providing a library of function objects that are accessible by way of the editor applet.

19. The method of claim 16, further comprising automatically launching an HTML page that comprises the HTML Netlist, the HTML page employable to at least one of monitor or control the I/O module.

20. The method of claim 16, further comprising saving the created Netlist within the network adaptor.

21. The method of claim 16, further comprising:

executing the HTML Netlist; and converting data supplied by applets within the executing HTML Netlist to data that conforms to an industrial automation protocol.

22. The method of claim 21, the industrial automation protocol is one or more of CIP, ProfiBus, FieldBus, EtherNetIP, DeviceNet, and ControlNet.

23. A method for remotely monitoring and controlling one or more I/O module(s), comprising:

receiving a request for an HTML page associated with a network adaptor that is connected to one or more I/O modules, the HTML page includes instantiated Java applets;

executing the Java applets to at least one of monitor, control, or edit graphical rendering of the one or more I/O modules;

editing the instantiated Java applets;

selecting a project associated with the instantiated Java applets;

saving the instantiated Java applets with respect to a selected project on at least one of a local drive and a network server drive;

associating the java applets with a library of objects, the library of objects facilitating functionality of individual java applets; and selecting and purchasing additional objects for creating or editing the HTML page.

24. A system for monitoring or controlling an I/O module from a remote location, comprising:

means for building an HTML page that includes one or more instantiated objects that facilitates at least one of monitoring and controlling the I/O module;

means for executing the instantiated objects;

means for editing the HTML page and the instantiated objects included therein;

means for selecting a project associated with the instantiated objects;

means for saving the instantiated objects with respect to a selected project on at least one of a local drive and a network server drive; and means for selecting and purchasing additional instantiated objects to facilitate editing the HTML page in accordance with the requirements of the I/O modules being monitored or controlled.

25. The system of claim 24, further comprising means for converting data from the I/O module to data that conforms to a web server.

* * * * *

UNITED STATES PATENT AND TRADEMARK OFFICE
CERTIFICATE OF CORRECTION

PATENT NO. : 7,587,251 B2 Page 1 of 1
APPLICATION NO. : 11/313979
DATED : September 8, 2009
INVENTOR(S) : Edward C. Hopsecger It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 316 days.

Signed and Sealed this

Twenty-first Day of September, 2010

David J. Kappos
*Director of the United States Patent and Trademark Office*